(12) United States Patent
Wronski et al.

(10) Patent No.: US 9,447,917 B1
(45) Date of Patent: *Sep. 20, 2016

(54) ADJUSTABLE HANGER BARS WITH DETACHMENT STOP

(71) Applicant: Cooper Technologies Company, Houston, TX (US)

(72) Inventors: Grzegorz Wronski, Peachtree City, GA (US); Rongxiu Huang, Shanghai (CN); Jared Michael Davis, Newnan, GA (US)

(73) Assignee: Cooper Technologies Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/975,520

(22) Filed: Dec. 18, 2015

Related U.S. Application Data

(63) Continuation of application No. 14/732,422, filed on Jun. 5, 2015, now Pat. No. 9,239,131.

(51) Int. Cl.
*F16M 13/02* (2006.01)
*F21V 21/04* (2006.01)

(52) U.S. Cl.
CPC ......... *F16M 13/022* (2013.01); *F16M 13/027* (2013.01); *F21V 21/048* (2013.01)

(58) Field of Classification Search
CPC . F16M 13/022; F16M 13/027; F21V 21/048
See application file for complete search history.

(56) References Cited

U.S. PATENT DOCUMENTS

| | | |
|---|---|---|
| 1,156,885 A | 10/1915 | Caine |
| 1,350,295 A | 8/1920 | Champeau |
| 1,622,087 A | 3/1927 | Calderwood |
| 1,756,361 A | 4/1930 | Johnson |
| 1,791,480 A | 2/1931 | Smith et al. |
| 1,821,733 A | 9/1931 | Thibodeau |
| 2,316,389 A | 4/1943 | Atkinson |
| 2,518,515 A | 8/1950 | Austin |
| 2,658,241 A | 11/1953 | Houghton et al. |
| 2,713,983 A | 7/1955 | Kay |
| 2,802,933 A | 8/1957 | Broadwin |
| 2,887,568 A | 5/1959 | Franck |
| 2,930,564 A | 3/1960 | Maier |
| 2,933,549 A | 4/1960 | Antonucci |

(Continued)

OTHER PUBLICATIONS

Halo Lighting "Edison Recessed Lighting" Cooper Industries No. ADV 693025 Jan. 1984.

(Continued)

*Primary Examiner* — Mary Ellen Bowman
(74) *Attorney, Agent, or Firm* — King & Spalding LLP

(57) ABSTRACT

A hanger bar assembly includes a first hanger bar member and a second hanger bar member. The first hanger bar member includes a first rail segment, a first channel segment including a first channel, and a first stoppage tab extending up above an edge of the first channel segment. The second hanger bar member includes a second rail segment positioned in the first channel of the first channel segment and a second channel segment that includes a second channel. The first rail segment is positioned in the second channel. The second hanger bar member further includes a second stoppage tab extending out in a horizontal direction. The first stoppage tab and the second stoppage tab are designed to abut against each other to prevent unintended disengagement of the first hanger bar member from the second hanger bar member.

20 Claims, 17 Drawing Sheets

(56) References Cited

U.S. PATENT DOCUMENTS

| | | |
|---|---|---|
| 3,040,172 A | 6/1962 | Chan |
| 3,099,404 A | 7/1963 | Kaufman et al. |
| 3,102,306 A | 9/1963 | Hutchinson |
| 3,104,087 A | 9/1963 | Budnick et al. |
| 3,154,001 A | 10/1964 | Zurawski |
| 3,162,413 A | 12/1964 | Hexdall |
| 3,300,634 A | 1/1967 | Libreman |
| 3,313,931 A | 4/1967 | Kugman |
| 3,597,889 A | 8/1971 | LoNigro |
| 3,609,338 A | 9/1971 | Kripp |
| 3,710,096 A | 1/1973 | McFarlin |
| 4,022,415 A | 5/1977 | Roderick et al. |
| 4,040,589 A | 8/1977 | McLay |
| 4,041,657 A | 8/1977 | Schuplin |
| 4,086,480 A | 4/1978 | Lahm |
| 4,114,327 A | 9/1978 | Williams |
| 4,122,762 A | 10/1978 | Williams |
| 4,149,693 A | 4/1979 | LoNigro |
| 4,165,851 A | 8/1979 | Bowden et al. |
| 4,190,355 A | 2/1980 | Avery et al. |
| 4,230,900 A | 10/1980 | Speet |
| 4,290,098 A | 9/1981 | Pierson |
| 4,336,575 A | 6/1982 | Gilman |
| 4,388,677 A | 6/1983 | Druffel |
| 4,391,428 A | 7/1983 | Grimes |
| 4,406,216 A | 9/1983 | Hott et al. |
| 4,408,262 A | 10/1983 | Kusmer |
| 4,475,147 A | 10/1984 | Kristofek |
| 4,511,113 A | 4/1985 | Druffel et al. |
| 4,519,019 A | 5/1985 | Hall |
| 4,545,000 A | 10/1985 | Fraley et al. |
| 4,564,888 A | 1/1986 | Lewin et al. |
| 4,566,057 A | 1/1986 | Druffel |
| 4,569,003 A | 2/1986 | Elmer et al. |
| 4,577,824 A | 3/1986 | Druffel et al. |
| 4,646,212 A | 2/1987 | Florience |
| 4,670,822 A | 6/1987 | Baker |
| 4,723,747 A | 2/1988 | Karp et al. |
| 4,729,080 A | 3/1988 | Fremont et al. |
| 4,742,440 A | 5/1988 | Guzzini |
| 4,754,377 A | 6/1988 | Wenman |
| 4,757,967 A | 7/1988 | Delmore et al. |
| 4,760,510 A | 7/1988 | Lahti |
| 4,760,981 A | 8/1988 | Hodges |
| 4,762,162 A | 8/1988 | Chockrek |
| 4,796,169 A | 1/1989 | Shemitz |
| 4,803,603 A | 2/1989 | Carson |
| 4,829,410 A | 5/1989 | Patel |
| 4,872,097 A | 10/1989 | Miller |
| 4,930,054 A | 5/1990 | Krebs |
| 4,967,990 A | 11/1990 | Rinderer |
| 4,972,339 A | 11/1990 | Gabrius |
| 4,978,092 A | 12/1990 | Nattel |
| 5,029,794 A | 7/1991 | Wolfe |
| 5,034,867 A | 7/1991 | Mayer |
| 5,044,582 A | 9/1991 | Walters |
| 5,045,985 A | 9/1991 | Russo et al. |
| 5,057,979 A | 10/1991 | Carson et al. |
| 5,073,845 A | 12/1991 | Aubrey |
| 5,074,515 A | 12/1991 | Carter, Jr. |
| 5,075,828 A | 12/1991 | Gordin et al. |
| 5,075,831 A | 12/1991 | Stringer et al. |
| 5,130,913 A | 7/1992 | David |
| 5,176,345 A | 1/1993 | Medlin |
| 5,178,503 A | 1/1993 | Losada |
| 5,209,444 A | 5/1993 | Rinderer |
| 5,222,800 A | 6/1993 | Chan et al. |
| 5,291,381 A | 3/1994 | Price |
| 5,316,254 A | 5/1994 | McCartha |
| D351,481 S | 10/1994 | Cole, Jr. |
| 5,374,812 A | 12/1994 | Chan et al. |
| 5,379,199 A | 1/1995 | Hirshenhorn et al. |
| 5,386,959 A | 2/1995 | Laughlin et al. |
| 5,452,816 A | 9/1995 | Chan et al. |
| 5,457,617 A | 10/1995 | Chan et al. |
| 5,505,419 A | 4/1996 | Gabrius |
| 5,571,256 A | 11/1996 | Good et al. |
| 5,581,448 A | 12/1996 | Harwood |
| 5,588,737 A | 12/1996 | Kusmer |
| 5,595,028 A | 1/1997 | Handzlik |
| 5,597,234 A | 1/1997 | Winkelhake |
| 5,618,017 A | 4/1997 | DeBoer |
| 5,619,263 A | 4/1997 | Laughlin et al. |
| 5,623,789 A | 4/1997 | Kidwell et al. |
| D384,431 S | 9/1997 | Bitton |
| 5,662,413 A | 9/1997 | Akiyama |
| 5,662,414 A | 9/1997 | Jennings et al. |
| 5,678,799 A | 10/1997 | Jorgensen et al. |
| 5,690,423 A | 11/1997 | Hentz et al. |
| 5,738,436 A | 4/1998 | Cummings et al. |
| 5,746,507 A | 5/1998 | Lee |
| 5,758,959 A | 6/1998 | Sieczkowski |
| 5,800,051 A | 9/1998 | Gampe et al. |
| 5,826,970 A | 10/1998 | Keller et al. |
| 5,845,886 A | 12/1998 | McCormick |
| 5,857,766 A | 1/1999 | Sieczkowski |
| 5,873,556 A | 2/1999 | Reiker |
| 5,934,631 A | 8/1999 | Becker et al. |
| 5,954,304 A | 9/1999 | Jorgensen |
| 5,957,573 A | 9/1999 | Wedekind et al. |
| 5,957,574 A | 9/1999 | Hentz et al. |
| 6,004,011 A | 12/1999 | Sieczkowski |
| 6,030,102 A | 2/2000 | Gromotka |
| 6,033,098 A | 3/2000 | Hentz et al. |
| 6,076,788 A | 6/2000 | Akiyama |
| 6,082,878 A | 7/2000 | Doubek et al. |
| 6,085,916 A | 7/2000 | Kovacevic et al. |
| 6,105,918 A | 8/2000 | Gromotka |
| 6,164,802 A | 12/2000 | Gromotka |
| 6,216,992 B1 | 4/2001 | Bisonaya et al. |
| 6,231,205 B1 | 5/2001 | Slesinger et al. |
| 6,286,265 B1 | 9/2001 | Rinderer |
| 6,296,211 B1 | 10/2001 | Snyder |
| 6,332,597 B1 | 12/2001 | Koroz et al. |
| 6,341,466 B1 | 1/2002 | Kehoe et al. |
| 6,345,800 B1 | 2/2002 | Herst et al. |
| 6,431,723 B1 | 8/2002 | Schubert et al. |
| 6,461,016 B1 | 10/2002 | Jamison et al. |
| 6,471,374 B1 | 10/2002 | Thomas et al. |
| 6,484,980 B2 | 11/2002 | Medlin, Sr. et al. |
| 6,505,960 B2 | 1/2003 | Schubert et al. |
| 6,519,791 B2 | 2/2003 | Randolph |
| 6,527,406 B1 | 3/2003 | Slesinger et al. |
| 6,609,690 B1 | 8/2003 | Davis |
| 6,637,705 B2 | 10/2003 | Sjoblom et al. |
| 6,688,069 B2 | 2/2004 | Zadeh |
| 6,691,968 B1 | 2/2004 | Tseng |
| 6,726,347 B2 | 4/2004 | Wronski |
| 6,805,916 B2 | 10/2004 | Cadieu et al. |
| 7,673,841 B2 | 3/2010 | Wronski |
| 7,735,795 B2 | 6/2010 | Wronski |
| 7,784,754 B2 | 8/2010 | Nevers et al. |
| 7,810,775 B2 | 10/2010 | Dal Ponte et al. |
| 7,832,889 B1 | 11/2010 | Cogliano |
| 7,896,529 B2 | 3/2011 | Wronski |
| 8,038,113 B2 | 10/2011 | Fryzek et al. |
| 8,177,176 B2 | 5/2012 | Nguyen et al. |
| 8,240,630 B2 | 8/2012 | Wronski |
| 8,622,361 B2 | 1/2014 | Wronski |
| 2005/0183344 A1 | 8/2005 | Ziobro et al. |
| 2005/0230589 A1 | 10/2005 | Wronski |
| 2005/0247842 A1 | 11/2005 | Wronski |
| 2007/0012847 A1 | 1/2007 | Tai |
| 2007/0075206 A1 | 4/2007 | Wright et al. |
| 2007/0261881 A1 | 11/2007 | Wronski |
| 2009/0231861 A1 | 9/2009 | Wedekind |
| 2010/0224404 A1 | 9/2010 | Rippel et al. |
| 2014/0301087 A1 | 10/2014 | Wronski et al. |

OTHER PUBLICATIONS

"Edison Lighting" ET 7001 P Cooper Industries 69417 Sep. 1989.
"Edison Lighting" ET 7070 ET 7071 ET7301 ET7401 ET 7410 Cooper Industries 694979 Dec. 1987.

(56) References Cited

OTHER PUBLICATIONS

Sears Owner's Manual Model No. 9 89575 694954 Oct. 1987.
Halo H-7T H-27T H-71CT H274 H275 Bar Hanger Installation Instruction 695876 Jun. 1989.
Halo H& Housing with Improved Plaster Frame Cooper Industries 692601 Jul. 1981.
Robert O. Parmley, P.E.; Standard Handbook of Fastening and Joining, Second Edition; McGraw-Hill Publishing; pp. 8-29 to 8-31, 1989.
Juno Lighting; Product specification; 6' Deluxe Universal TC Housing; TC2; Feb. 2009.
Juno Lighting; Product sepcification; 6' Vertical IC Compact Fluorescent Housing; ICPL618E; Aug. 2012.
Philips Lightolier; Product specification; Lytening LED; Oct. 2012.
Progress Lighting; Product specification; 5' Shallow Housing IC, Non-IC & Air-Tight; Nov. 2001.
Progress Lighting; Product specification; 6' Housing IC, Non-IC & Air-Tight; Nov. 2013.
Progress Lighting; Product specification; 6' Housing IC, Non-IC & Air-Tight w/ Quick Connects; Nov. 2013.
Nora Lighting; Product specification; NHRIC-504QAT; 5' IC Air-Tight Line Voltage Remodel Housing; Jan. 2, 2002.
WAC Lighting; Product specification; R-602D-N-ICA; 6' Line Voltage New Construction Housing 120V-IC Rated-airtight Ready; Apr. 2014.
Prescolite; LiteBox-Light Commercial and Residential Downlights; Catalog; Jan. 2009.
Prescolite; LiteBox 6'; Product sepcification; New Construction DBXMRI; Mar. 22, 2011.
Lithonia Lighting; Residential Recessed Downlighting Guide; Feb. 2014.

ADJUSTABLE HANGER BARS WITH DETACHMENT STOP

CROSS-REFERENCE TO RELATED APPLICATIONS

This application is a continuation of and claims priority to U.S. patent application Ser. No. 14/732,422, filed Jun. 5, 2015, titled "Adjustable Hanger Bars With Detachment Stop," the entire content of which is hereby incorporated herein by reference.

TECHNICAL FIELD

The present disclosure relates generally to lighting solutions, and more particularly to detachment prevention structures for adjustable hanger bars used for mounting a luminaire on a support structure.

BACKGROUND

A luminaire (i.e., a light fixture) is typically a complete lighting unit consisting of one or more lamps, socket, and optical devices for distributing light. A recessed luminaire is an example of a luminaire that is installed behind a structure such as a ceiling. Recessed luminaires are used in both commercial and residential applications. For example, a recessed luminaire is typically mounted on support structures behind a ceiling wall that has an opening to allow light from the recessed luminaire to illuminate an area below the ceiling wall.

Various support systems have been employed to support recessed luminaires. For example, recessed luminaires are often suspended between support structures such as joists and T-bar structures. To illustrate, a recessed luminaire may be supported by hanger bars that extend between parallel support structures. Generally, hanger bars need to have adequate strength and rigidity to reliably support a recessed luminaire. Further, because the spacing between the support structures such as the joists of a ceiling structure may vary, adjustability of the lengths of hanger bars is desirable for easy installation as well as for compatibility with different support structures. However, unintended detachment of hanger bar members from each other can make installation of hanger bars difficult, which can waste time and money.

Thus, adjustable hanger bars that have structures that prevent or reduce risk of unintended detachment of the hanger bars from each other are desirable.

SUMMARY

In general, the present disclosure relates to detachment prevention structures for adjustable hanger bars that are used for mounting a luminaire on a support structure. In an example embodiment, a hanger bar assembly includes a first hanger bar member and a second hanger bar member. The first hanger bar member includes a first rail segment, a first channel segment including a first channel, and a first stoppage tab disposed proximal to an end portion of the first hanger bar and extending up above an edge of the first channel segment. The second hanger bar member includes a second rail segment positioned in the first channel of the first channel segment and a second channel segment that includes a second channel. The first rail segment is positioned in the second channel. The second hanger bar member further includes a second stoppage tab disposed proximal to an end portion of the second hanger bar and extending out in a horizontal direction. The first stoppage tab and the second stoppage tab are designed to abut against each other to prevent unintended disengagement of the first hanger bar member from the second hanger bar member.

In another example embodiment, a hanger bar assembly includes a first hanger bar member and a second hanger bar member attachable to the first hanger bar member. The first hanger bar member includes a first rail segment, a first channel segment including a first channel, and a first stoppage tab disposed proximal to an end portion of the first hanger bar and extending up above an edge of the first channel segment. The second hanger bar member includes a second rail segment designed to be positioned in the first channel of the first channel segment. The second hanger bar member further includes a second channel segment including a second channel. The first rail segment is designed to be positioned in the second channel. The second hanger bar member also includes a second stoppage tab disposed proximal to an end portion of the second hanger bar and extending out in a horizontal direction. After the first hanger bar member and the second hanger bar member are attached to each other, the first stoppage tab and the second stoppage tab are designed to abut against each other to prevent unintended disengagement of the first hanger bar member from the second hanger bar member.

In another example embodiment, a luminaire mounting structure for mounting a recessed luminaire includes a first hanger bar assembly, a second hanger bar assembly, and a plaster frame. The first hanger bar assembly is attached to the plaster frame on a first side of the plaster frame, and the second hanger bar assembly is attached to the plaster frame on a second side of the plaster frame opposite the first side. Each of the first hanger bar assembly and the second hanger bar assembly includes a first hanger bar member and a second hanger bar member. The first hanger bar member includes a first rail segment, a first channel segment including a first channel, and a first stoppage tab disposed proximal to an end portion of the first hanger bar and extending up above an edge of the first channel segment. The second hanger bar member includes a second rail segment designed to be positioned in the first channel of the first channel segment. The second hanger bar member further includes a second channel segment including a second channel. The first rail segment is designed to be positioned in the second channel. The second hanger bar member also includes a second stoppage tab disposed proximal to an end portion of the second hanger bar and extending out in a horizontal direction. After the first hanger bar member and the second hanger bar member are attached to each other, the first stoppage tab and the second stoppage tab are designed to abut against each other to prevent unintended disengagement of the first hanger bar member from the second hanger bar member.

These and other aspects, objects, features, and embodiments will be apparent from the following description and the claims.

BRIEF DESCRIPTION OF THE DRAWINGS

Reference will now be made to the accompanying drawings, which are not necessarily drawn to scale, and wherein.

Figure 1:
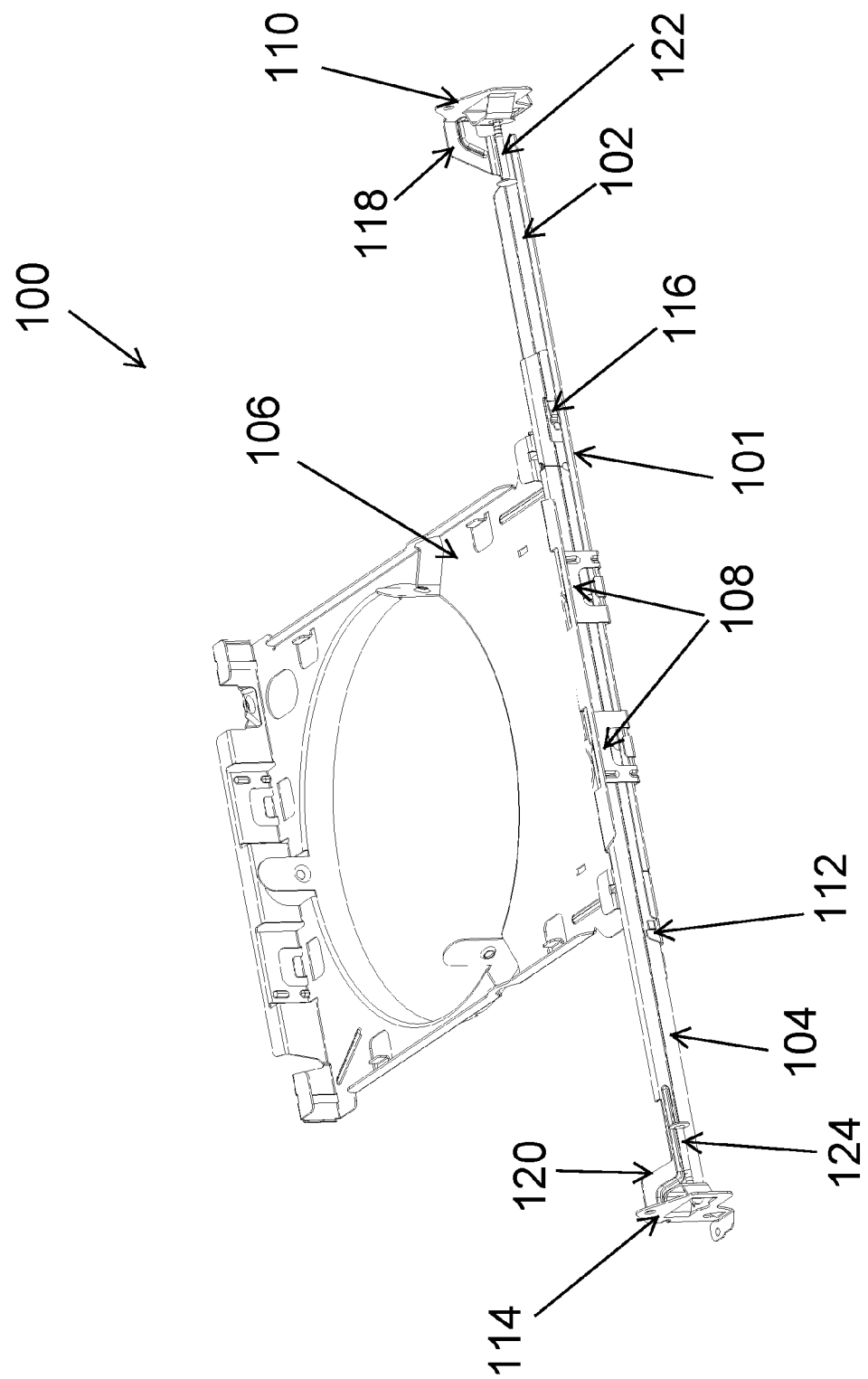
FIG. 1 illustrates a luminaire mounting structure including a hanger bar assembly according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, reference numerals designate like or corresponding, but not necessarily identical, elements.

DETAILED DESCRIPTION OF THE EXAMPLE EMBODIMENTS

In the following paragraphs, example embodiments will be described in further detail with reference to the figures. In the description, well known components, methods, and/or processing techniques are omitted or briefly described. Furthermore, reference to various feature(s) of the embodiments is not to suggest that all embodiments must include the referenced feature(s).

Turning now to the figures, example embodiments are described. FIG. 1 illustrates a luminaire mounting structure 100 including a hanger bar assembly 101 according to an example embodiment. The luminaire mounting structure 100 includes the first hanger bar assembly 101 and the plaster frame 106. The first hanger bar assembly 101 is attached to a plaster frame 106. The luminaire mounting structure 100 may be used to install a luminaire, such as a recessed luminaire, to support structures, such as joists. For example, the support structures may be parallel support structures that are behind a ceiling. The hanger bar assembly 101 may be attached to the plaster frame 106 by passing the first hanger bar member 102 and the second hanger bar member 104 through the spaces between the attachment tabs 108 and the rest of the plaster frame 106. In some example embodiments, each attachment tab 108 may be a loop that is, for example, integrally formed with the plaster frame 106.

In some example embodiments, the hanger bar assembly 101 includes a first hanger bar member 102 and a second hanger bar member 104. The first hanger bar member 102 and the second hanger bar member 104 are interlocked with each other as illustrated in FIG. 1. The hanger bar assembly 101 is adjustable in length by slidably moving one or both of the first hanger bar member 102 and the second hanger bar member 104. The length adjustability allows for use of the hanger bar assembly 101 with different pairs of support structures that have different spacings among the pairs.

In some example embodiments, the first hanger bar member 102 may include a first stoppage tab 112, and the second hanger bar member 104 may include a stoppage tab 116. The stoppage tabs 112, 116 may prevent or reduce the risk of unintended disengagement of the first hanger bar member 102 and the second hanger bar member 104 from each other, which will in turn prevent or reduce the risk of unintended disengagement of the hanger bar assembly 101 from the plaster frame 106.

In some example embodiments, the first hanger bar assembly 101 includes a first attachment head 110 and a second attachment head 114. The first attachment head 110 is coupled to the first hanger bar member 102 by a first coupling segment 118. The second attachment head 114 is coupled to the second hanger bar member 104 by a second coupling segment 120. The attachment heads 110, 114 are designed to secure the hanger bar assembly 101 to support structures, such as parallel joists, suspended ceiling T-grids, and/or steel framing. For example, the attachment head 110 may include a fastener 122 (e.g., a screw or nail) that may be used to secure the attachment head 110 to a support structure. Similarly, the attachment head 114 may include a fastener 124 (e.g., a screw or nail) that may be used to secure the attachment head 114 to another support structure.

Figure 2:
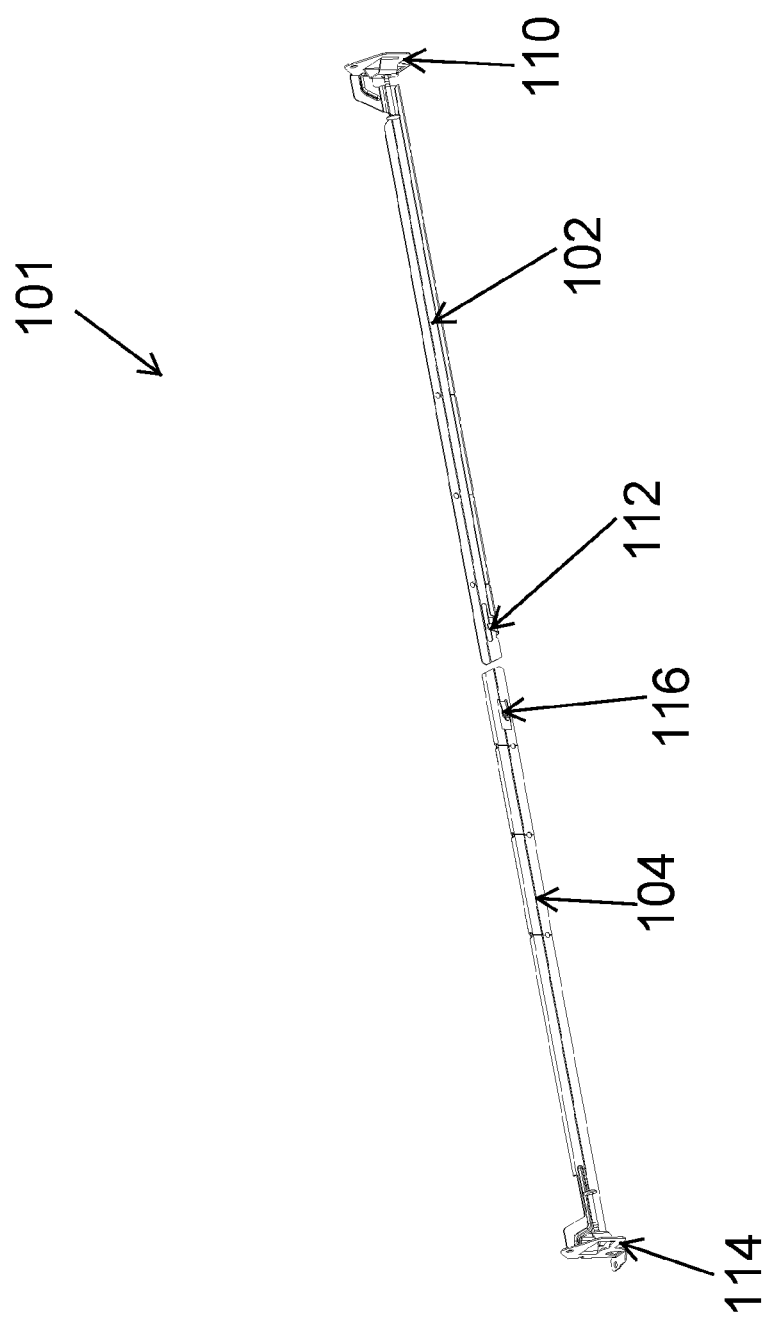
FIG. 2 illustrates the hanger bar assembly of FIG. 1 according to an example embodiment.

FIG. 2 illustrates the hanger bar assembly 101 of FIG. 1 according to an example embodiment. As illustrated in FIG. 2, the hanger bar assembly 101 includes the first hanger bar member 102 and the second hanger bar member 104. In FIG. 2, the first hanger bar member 102 and the second hanger bar member 104 are not interlocked with each other. The first hanger bar member 102 and the second hanger bar member 104 may be interlocked with each other as illustrated, for example, in FIG. 1. Once the first hanger bar member 102 and the second hanger bar member 104 are interlocked, the hanger bar assembly 101 is freely adjustable lengthwise (i.e., longitudinally).

Once the first hanger bar member 102 and the second hanger bar member 104 are interlocked, for example, as shown in FIG. 1, the stoppage tabs 112 and 116 may abut against each other and prevent or reduce the risk of unintended disengagement of the first hanger bar member 102 and the second hanger bar member 104 from each other. While preventing or reducing the risk of unintended disengagement of the first hanger bar member 102 and the second hanger bar member 104, the stoppage tabs 112 and 116 allow disengagement of the first hanger bar member 102 and the second hanger bar member 104 from each other by a user with relative ease. For example, when the first hanger bar member 102 and the second hanger bar member 104 are interlocked, a user may apply a small amount of force on the stoppage tab 116 and slidably move the first hanger bar member 102 or the second hanger bar member 104 to intentionally disengage the first hanger bar member 102 and the second hanger bar member 104 from each other.

As illustrated in FIG. 2, the first attachment head 110 is attached to the first hanger bar member 102, and the second attachment head 114 is attached to the second hanger bar member 104. As explained above, the first attachment head 110 and the second attachment head 114 may be used to attach the hanger bar assembly 101 to support structures such as parallel joists or inverted T-bars.

In some example embodiments, the first hanger bar member 102 and the second hanger bar member 104 may be made from steel by methods such as forming, stamping, etc.

For example, the first hanger bar member 102 and the second hanger bar member 104 may be made from galvanized steel.

Figure 3:
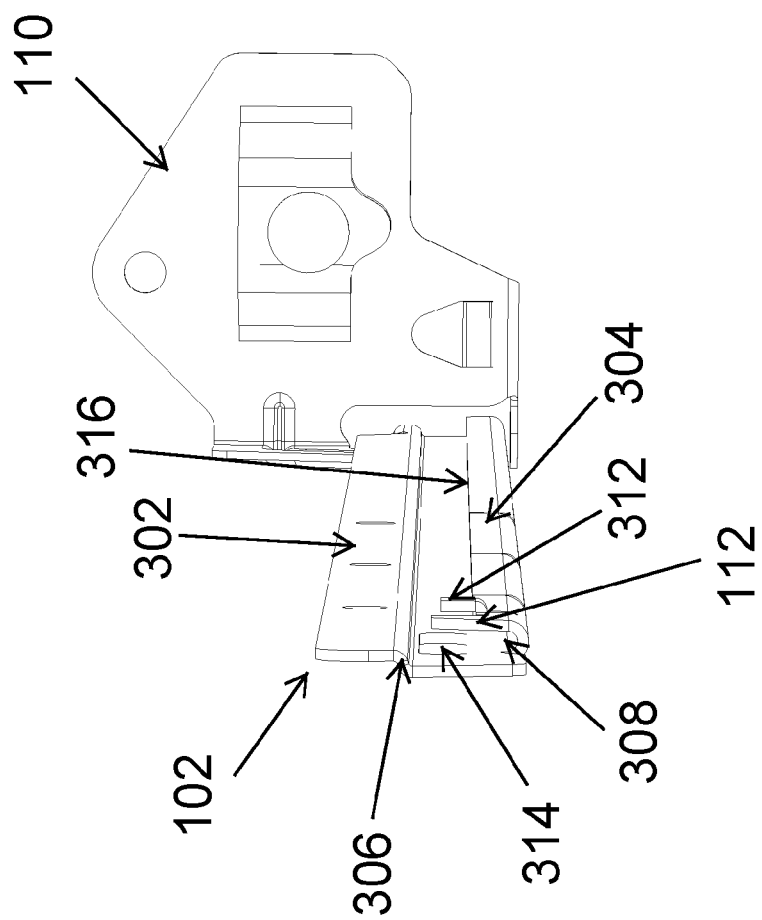
FIG. 3 illustrates a hanger bar member of the hanger bar assembly of FIGS. 1 and 2 according to an example embodiment.

FIG. 3 illustrates the hanger bar member 102 of the hanger bar assembly 101 of FIGS. 1 and 2 according to an example embodiment. As illustrated in FIG. 3, the first hanger bar member 102 includes a rail segment 302 and a channel segment 304. The channel segment 304 includes a channel 308 that is bound by walls of the channel segment 304. For example, the channel 308 may have a U-shape. The first hanger bar member 102 may also include a middle segment 306 that extends between the rail segment 302 and the channel segment 304. For example, the middle segment 306 may extend from a wall of the channel segment 304 and may be slanted relative to the rail segment 302 and the wall of the channel segment 304 where the rail segment 302 and wall of the channel segment 304 are horizontally offset from each other.

In some example embodiments, the first hanger bar member 102 includes the first stoppage tab 112 that is disposed proximal to an end portion of the first hanger bar 102. The stoppage tab 112 extends up above an edge 316 of the first channel segment 304. The first hanger bar member 102 may further include a guide tab 312 that extends up above the edge 316 of the first channel segment 304. As illustrated in FIG. 3, the guide tab 312 is horizontally offset from the first stoppage tab 112.

In some example embodiments, the first hanger bar member 102 includes an opening 314. For example, the opening 314 may be formed in a wall of the channel segment 304. The first stoppage tab 112 may be aligned with the opening 314. The guide tab 312 may also be aligned with the opening 314.

In some example embodiments, the first hanger bar member 102 is attached to the first attachment head 110. For example, the first hanger bar member 102 and the first attachment head 110 may be integrally formed. Alternatively, the first hanger bar member 102 and the first attachment head 110 may be made separately and coupled to each other by means such as soldering, riveting, and soldering.

In some example embodiments, the stoppage tab 112 and the guide tab 312 may be disposed on the first hanger bar member 102 at locations other than shown in FIG. 3. For example, the stoppage tab 112 and the guide tab 312 may be located closer to the middle of the first hanger bar member 102 than shown in FIG. 3. In some example embodiments, the opening 314 may also be located at a different location on the first hanger bar member 102 than shown in FIG. 3.

Figure 4A:
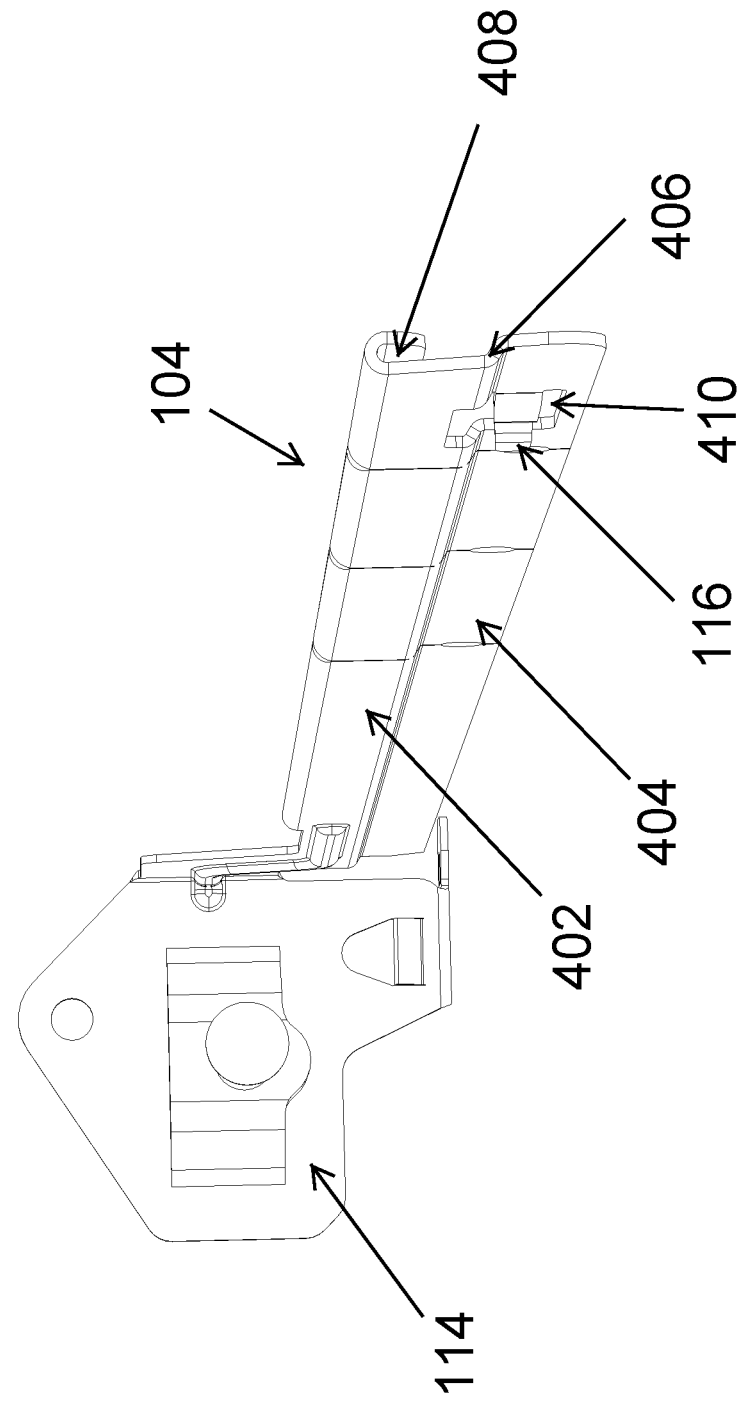
FIGS. 4A and 4B illustrate another hanger bar member of the hanger bar assembly of FIGS. 1 and 2 according to an example embodiment.
Figure 4B:
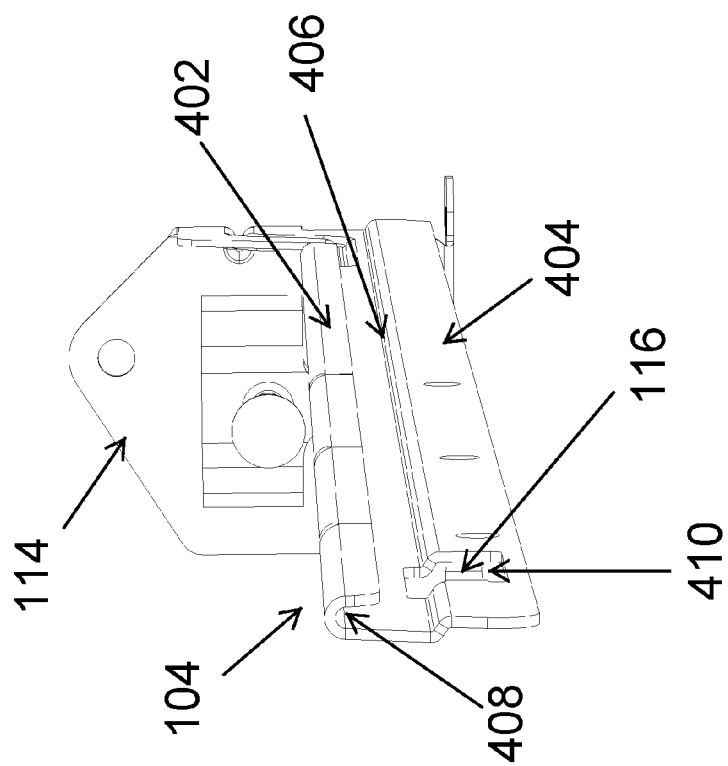

FIGS. 4A and 4B illustrate the hanger bar member 104 of the hanger bar assembly 101 of FIGS. 1 and 2 according to an example. As illustrated in FIGS. 4A and 4B, the second hanger bar member 104 includes a channel segment 402 and a rail segment 404. The channel segment 402 includes a channel 408 that is bound by walls of the channel segment 402. For example, the channel 408 may have a U-shape. The second hanger bar member 104 may also include a middle segment 406 that extends between the channel segment 402 and the rail segment 404. For example, the middle segment 406 may extend out from a wall of the channel segment 402 and may be slanted relative to the rail segment 404 and the wall of the channel segment 402 where the rail segment 404 and wall of the channel segment 402 are horizontally offset from each other.

In some example embodiments, the second hanger bar member 104 includes the second stoppage tab 116 that is disposed proximal to an end portion of the second hanger bar 104. As illustrated in FIGS. 4A and 4B, the stoppage tab 116 extends out horizontally in a general direction toward the second attachment head 114.

In some example embodiments, the second hanger bar member 104 includes an opening 410. For example, the second stoppage tab 116 may be aligned with the opening 410 such that the second stoppage tab 116 may elastically swing laterally toward and away from the opening 410.

In some example embodiments, the second hanger bar member 104 is attached to the second attachment head 114. For example, the second hanger bar member 104 and the second attachment head 114 may be integrally formed. Alternatively, the second hanger bar member 104 and the second attachment head 114 may be made separately and coupled to each other by means such as soldering, riveting, and soldering.

In some example embodiments, the stoppage tab 116 may be disposed on the first hanger bar member 102 at a location other than shown in FIGS. 4A and 4B. For example, the stoppage tab 112 may be located closer to the middle of the first hanger bar member 102 than shown in FIGS. 4A and 4B.

Figure 5:
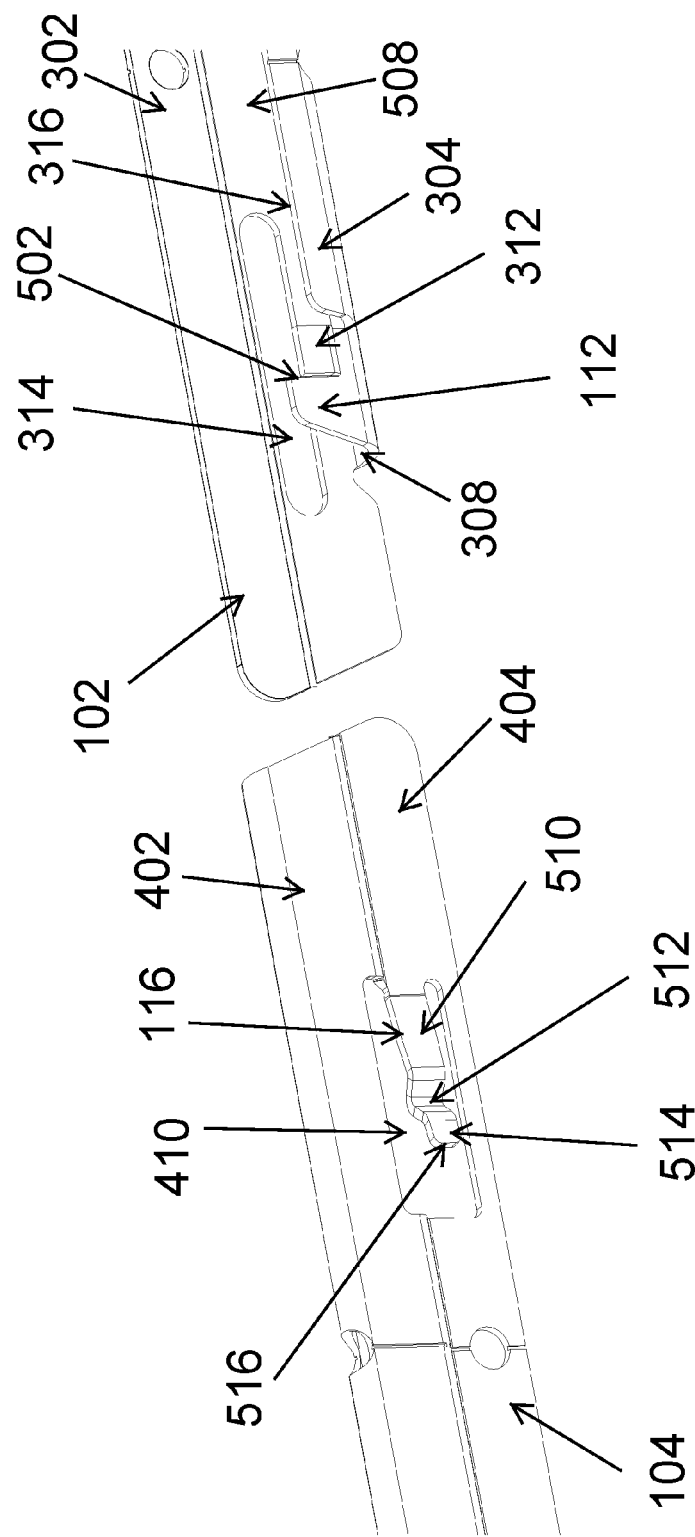
FIG. 5 illustrates stoppage structures of the hanger bar members of the hanger bar assembly of FIGS. 1 and 2 according to an example embodiment.

FIG. 5 illustrates stoppage structures of the hanger bar members 102, 104 of the hanger bar assembly 101 of FIGS. 1 and 2 according to an example embodiment. In FIG. 5, the first hanger bar member 102 and the second hanger bar member 104 are shown prior to being interlocked with each other. The first hanger bar member 102 includes the stoppage tab 112 that extends up above an edge 316 of the channel segment 304. The second hanger bar member 104 includes a stoppage tab 116 that extends horizontally from the rail segment 404. For example, the stoppage tab 116 may extend out at angle of approximately 10 degrees from a vertical plane of the rail segment 404. When the first hanger bar member 102 and the second hanger bar member 104 are interlocked, an edge 502 of the first tab 112 may abut against the stoppage tab 116 to prevent or reduce the risk of unintended detachment/disengagement of the first hanger bar member 102 and the second hanger bar member 104 from each other.

In some example embodiments, the first hanger bar member 102 further includes the guide tab 312 that also extends above the edge 316 of the channels segment 304. To illustrate, the guide tab 312 may serve as a guide to the stoppage tab 116 of the second hanger bar member 104 during detachment of the first hanger bar member 102 and the second hanger bar member 104 from each other.

The first hanger bar member 102 and the second hanger bar member 104 may be interlocked by sliding the rail segment 302 of the first hanger bar member 102 in the channel 408 (shown in FIG. 4A) of the channel segment 402 and by sliding the rail segment 404 of the second hanger bar member 104 into the channel 308 of the channel segment 304. When the first hanger bar member 102 and the second hanger bar member 104 are interlocked with each other, for example, as shown in FIGS. 1 and 2, the rail segment 302 is positioned in the channel 408 of the channel segment 402 of the second hanger bar member 104, and the rail segment 404 of the second hanger bar member 104 is positioned in the channel 308 of the channel segment 304 of the first hanger bar member 102.

As shown in FIG. 5, prior to the interlocking of the hanger bar members 102, 104, the rail segment 404 of the second hanger bar member 104 is aligned with the channel 308 of the first hanger bar member 102, and the rail segment 302 of the first hanger bar member 102 is aligned with the channel 408 (shown in FIG. 4A) of the second hanger bar member 104. By extending beyond the stoppage tabs 112, 116, the end portions of hanger bars members 102, 104 aid in the alignment of the first hanger bar member 102 and the second hanger bar member 104 with each other.

In some example embodiments, the first hanger bar member 102 may also have the opening 314 in a wall 508 of the channel segment 304 to allow at least a portion of the stoppage tab 116 to elastically move into and through the opening 314 in a direction away from the stoppage tab 112. For example, a portion of the stoppage tab 116 may move into the opening 314 as the stoppage tab 112 and the stoppage tab 116 pass by each other during attachment and detachment of the first hanger bar member 102 and the second hanger bar member 104 to/from each other.

In some example embodiments, the stoppage tab 116 includes a back section 510, a middle section 512, and a front section 514. The middle section 512 is disposed between the back section 510 and the front section 514. As illustrated in FIG. 5, the middle section 512 may protrude toward the opening 410 in the second hanger bar 104. In some example embodiments, the stoppage tab 116 includes an edge 516. For example, the edge 516 may be an edge of the front section 514. As described in more detail below, the edge 516 of the stoppage tab 116 may abut against the edge 502 of the stoppage tab 112 to prevent or reduce the risk of unintended detachment of the first hanger bar member 102 and the second hanger bar member 104 from each other.

The stoppage tab 112 and the stoppage tab 116 may be dimensioned such that, once the first hanger bar member 102 and the second hanger bar member 104 are interlocked, the stoppage tab 112 and the stoppage tab 116 prevent or reduce the risk of unintended detachment of the first hanger bar member 102 and the second hanger bar member 104 from each other. Although the stoppage tab 112 and the stoppage tab 116 prevent or reduce the risk of unintended detachment, a person may intentionally detach the first hanger bar member 102 and the second hanger bar member 104 from each other with relative ease, for example, by pushing the stoppage tab 116 in direction away from the stoppage tab 112 while pulling the first hanger bar member 202 and the second hanger bar member 204 away from each other. The stoppage tab 116 may have spring-like response to a force that is applied to it such that the stoppage tab 116 may return to substantially its original position upon removal of the force.

In some example embodiments, the first hanger bar member 102 and the second hanger bar member 104 are made from sheet metal. For example, the sheet metal may be raw steel or galvanized steel. In some example embodiments, the first hanger bar member 102 and the second hanger bar member 104 may be made by forming, stamping, and/or other methods as may be contemplated by those of ordinary skill in the art with the benefit of this disclosure.

Although the middle section 512 is shown as having a curved shape, in alternative embodiments, the middle section 512 may have other shapes without departing from the scope of this disclosure. In some alternative embodiments, the edge 516 may be have a different shape than shown in FIG. 5 without departing from the scope of this disclosure. Further, in some alternative embodiments, the stoppage tab 112, the stoppage tab 116 and the guide tab 314 may have shapes other than shown in FIG. 5 without departing from the scope of this disclosure. In some alternative embodiments, the stoppage tabs 112, 116 may be disposed on the respective hanger bar members 102, 104 on locations other than shown in FIG. 6.

Figure 6:
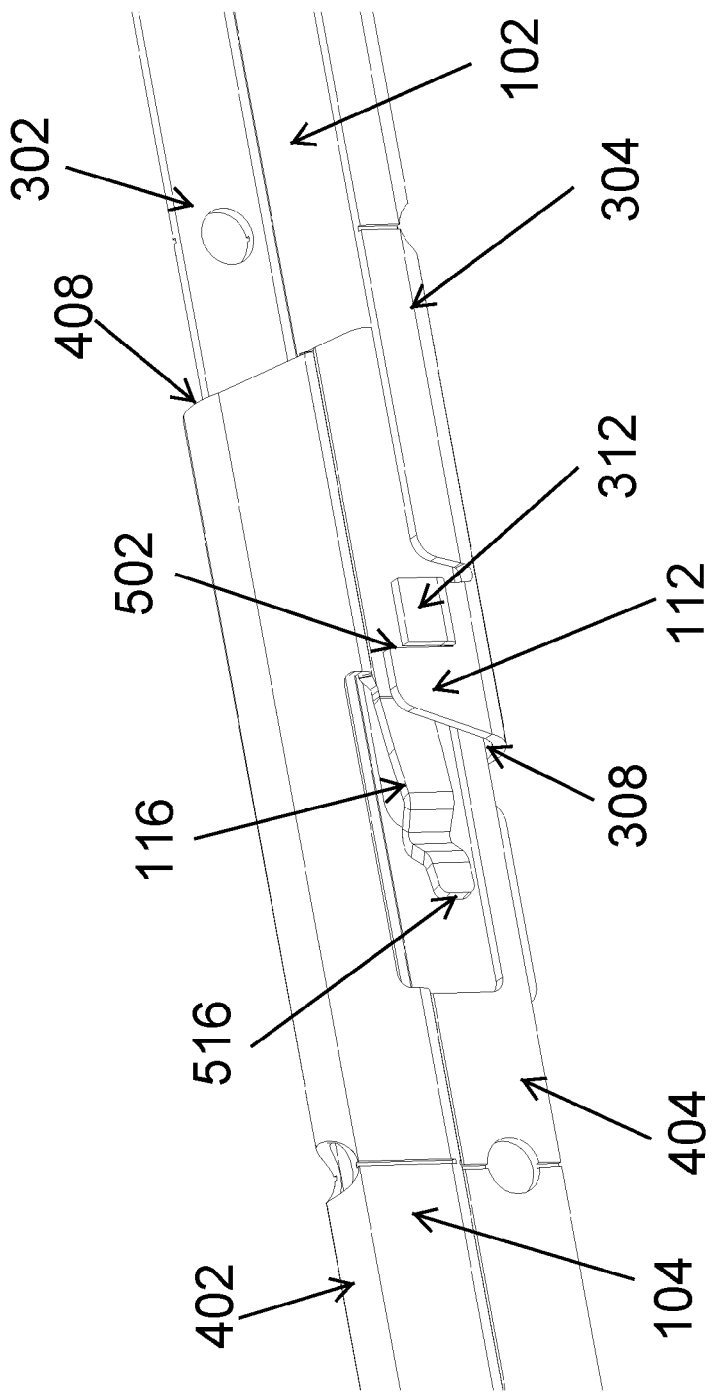
FIGS. 6-11 illustrate the hanger bar members of the hanger bar assembly of FIGS. 1 and 2 at various interlocked stages according to an example embodiment.

FIGS. 6-11 illustrate the hanger bar members 102, 104 of the hanger bar assembly 101 of FIGS. 1 and 2 at various interlocked stages according to an example embodiment. In FIG. 6, the first hanger bar member 102 and the second hanger bar member 104 are in contact with each other. To illustrate, an end portion of the first hanger bar member 102 is positioned in the channel 408 of the channel segment 402 of the second hanger bar member 104, and an end portion of the second hanger bar member 104 is positioned in the channel 308 of the channel segment 304 of the first hanger bar member 102. The stoppage tab 116 is partially aligned but not in contact with the stoppage tab 112.

Figure 7:
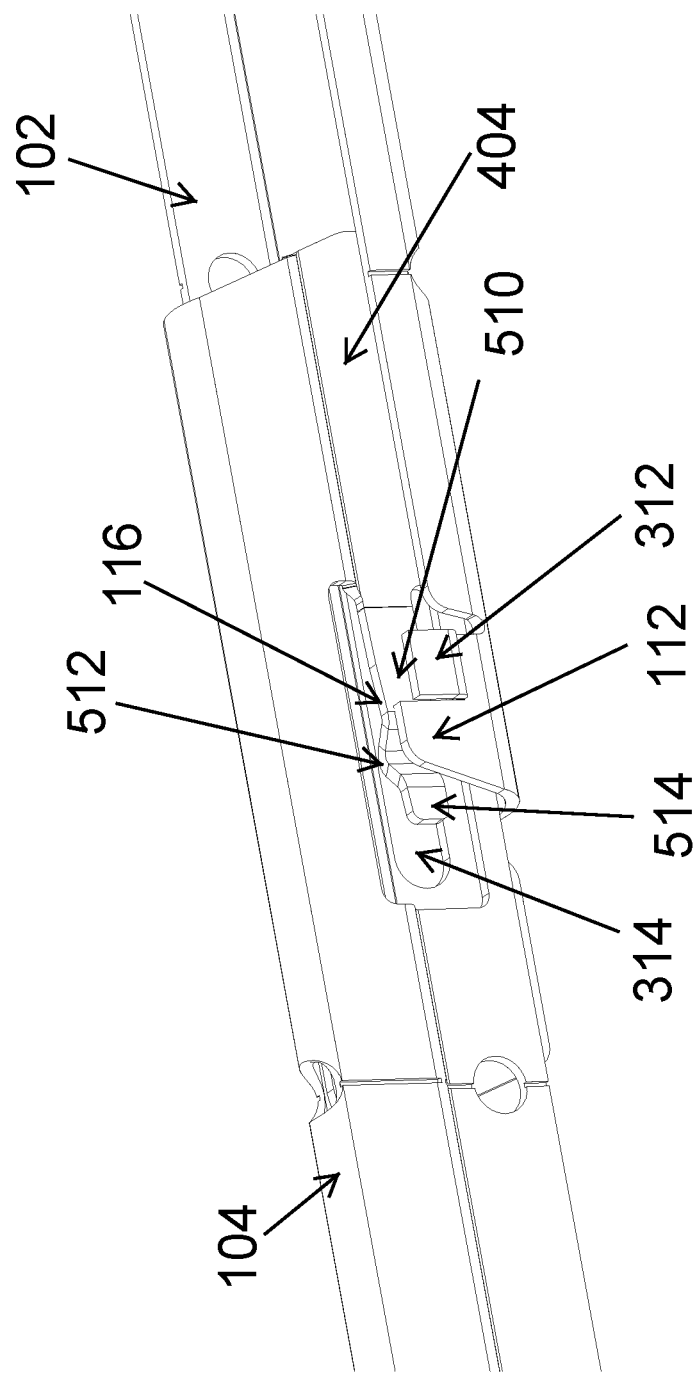

In FIG. 7, the first hanger bar member 102 and the second hanger bar member 104 have moved further toward each other relative to FIG. 6. For example, a large portion of the back section 510 of the stoppage tab 116 has moved past the stoppage tab 112 of the first hanger bar member 102 and is partially aligned with the guide tab 312. The middle section 512 is generally aligned with the stoppage tab 112, and the front section 514 remains on the left of the stoppage tab 112. The stoppage tab 116 is generally aligned with the opening 314 in the first hanger bar member 102. In FIG. 7, a small portion of the back section 510 of the stoppage tab 116 is in contact with the stoppage tab 112. For example, a portion of the back section 510 may come in contact with the surface of the stoppage tab 112 as the back section 510 of the stoppage tab 116 moves from the position shown in FIG. 6 to the position shown in FIG. 7.

Figure 8:
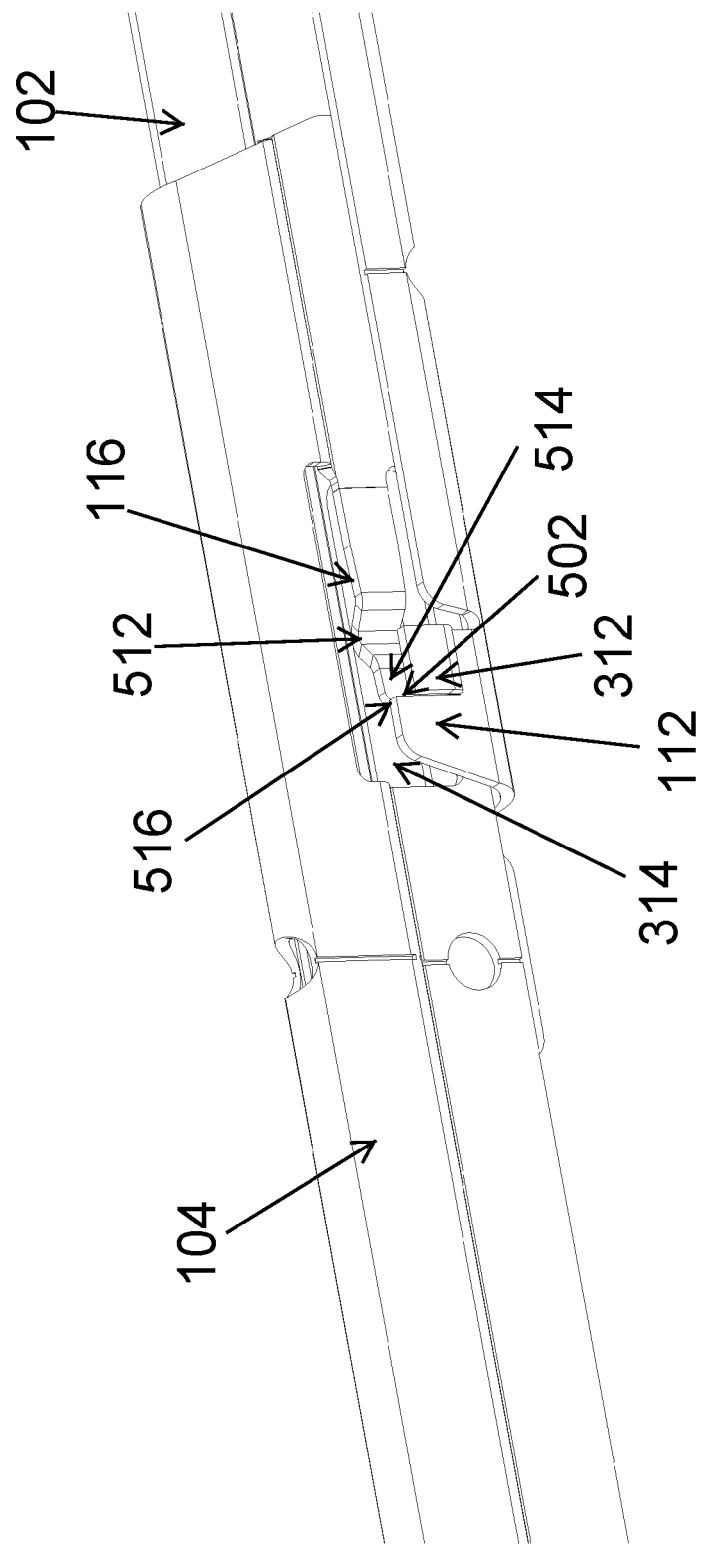

In FIG. 8, the stoppage tab 116 is still generally aligned with the opening 314 in the second hanger bar member 104. The stoppage tab 116 has come in contact with the stoppage tab 112 and has been forced to move laterally toward the opening 314. For example, a portion of the middle section 512 may be in the opening 314 of the second hanger bar member 104. In FIG. 8, the edge 516 of the stoppage tab 116 has not yet reached and is not in contact with the edge 502 of the stoppage tab 112. The front section 514 of the stoppage tab 116 is substantially aligned with the guide tab 312 while partially in contact with a surface of the stoppage tab 112 facing the opening 314.

Figure 9:
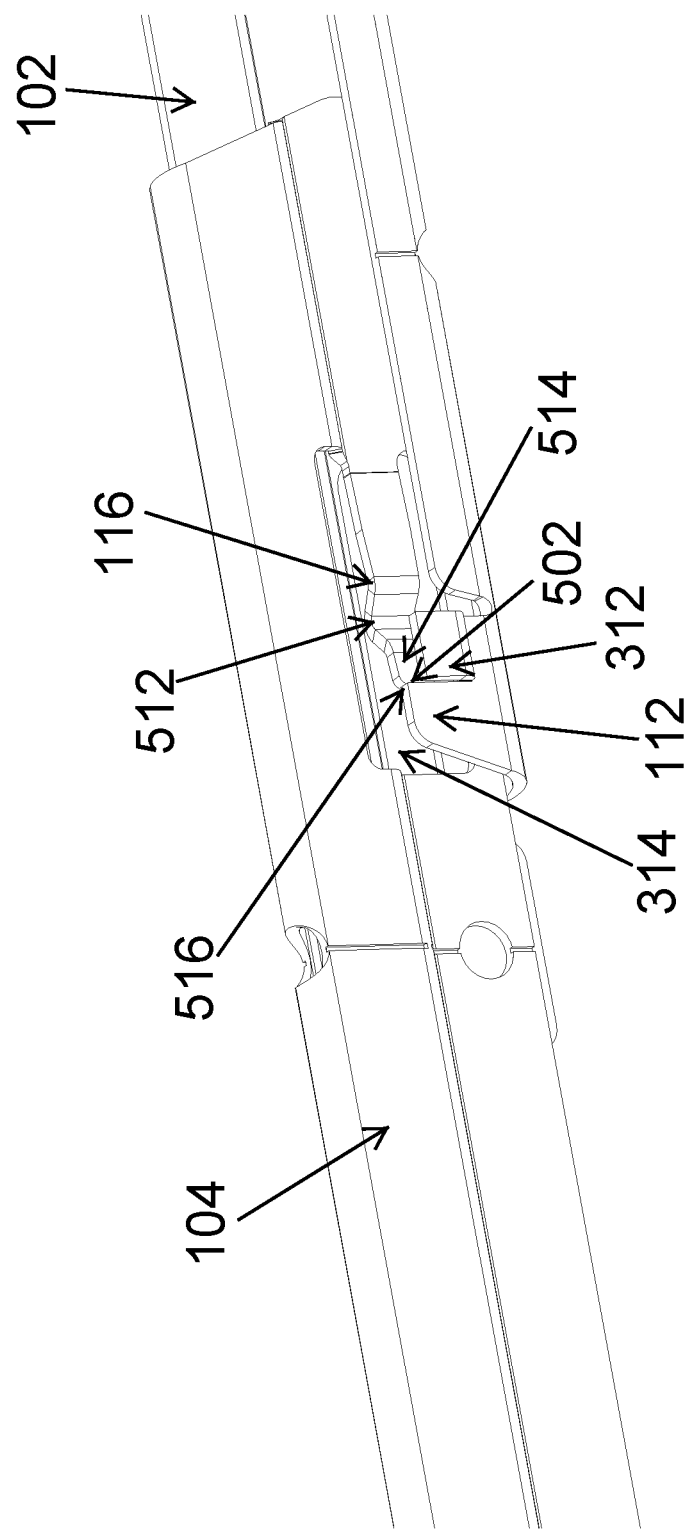

In FIG. 9, the first hanger bar member 102 and the second hanger bar member 104 have moved slightly relative to FIG. 8 such that the edge 516 and the edge 502 are at least partially abutted against each other. The stoppage tab 116 remains generally aligned with the opening 314 in the second hanger bar member 104. In FIG. 9, the stoppage tab 116 has moved laterally toward the guide tab 312 due to the spring-like characteristic of the stoppage tab 116 which is no longer pushed by the stoppage tab 112 toward the opening 314. The middle section 512 may be aligned with but not within the opening 314.

Figure 10:
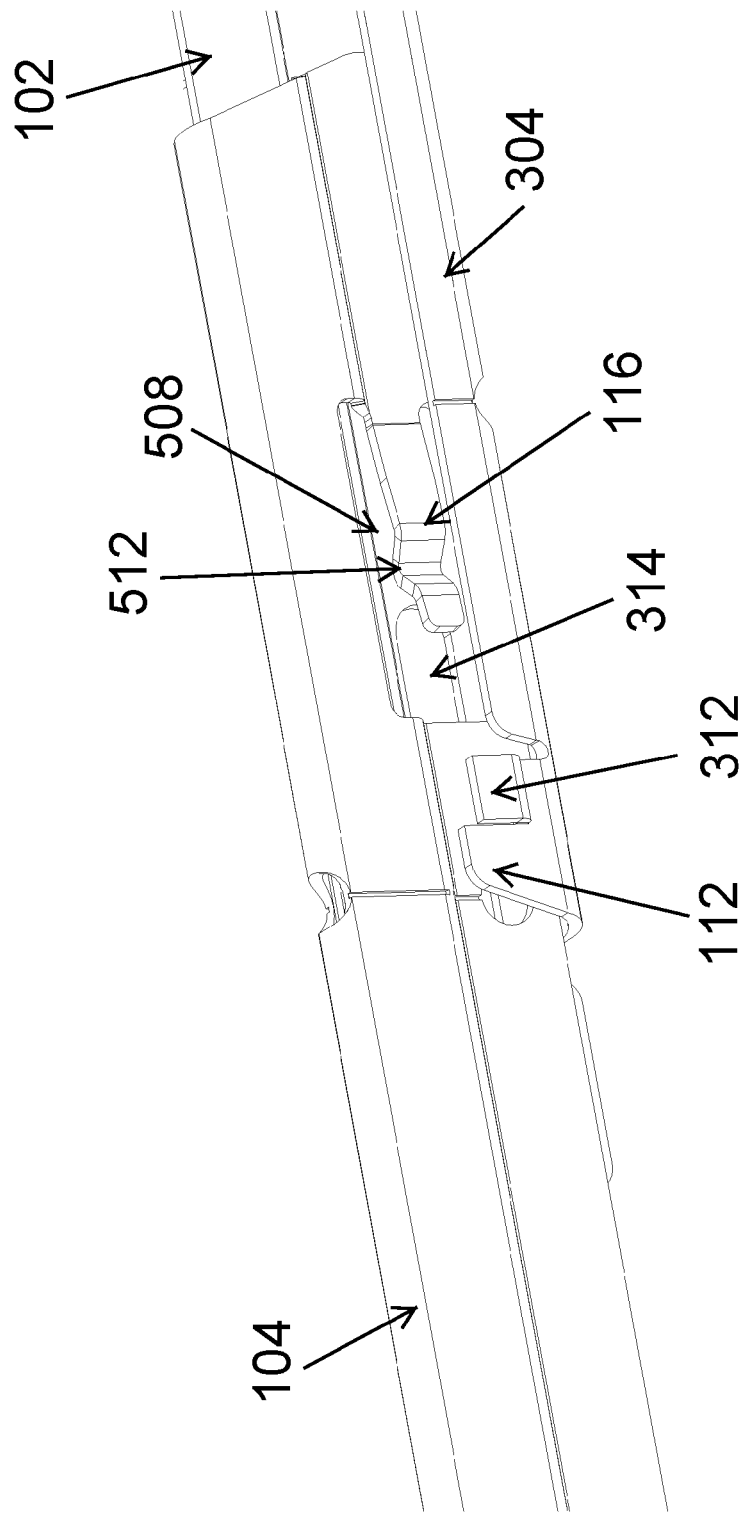

In FIG. 10, the stoppage tab 116 has is positioned entirely past the stoppage tab 112 relative FIG. 6-8. For example, the middle section 512 may be in contact with a wall 508 of the first hanger bar member 102 after moving past the opening 314 in the first hanger bar member 102. In some example embodiments, the wall 508 may have further pushed the stoppage tab 116 laterally as the stoppage tab 116 moved past the opening 314. Because of the elastic characteristics of the material (e.g., steel) that the second hanger bar member 104 is made from, as the middle section 512 moves past the opening 314, the stoppage tab 116 is pushed out by the wall 508 such that the edge 516 of the stoppage tab 116 is at least partially aligned with the edge 502 of the stoppage tab 112. From the positions of the first hanger bar member 102 and the second hanger bar member 104 shown in FIG. 10, the first hanger bar member 102 and the second hanger bar member 104 may be moved further toward each other to shorten the overall length of the hanger bar assembly 101 (shown in FIG. 1).

Figure 11:
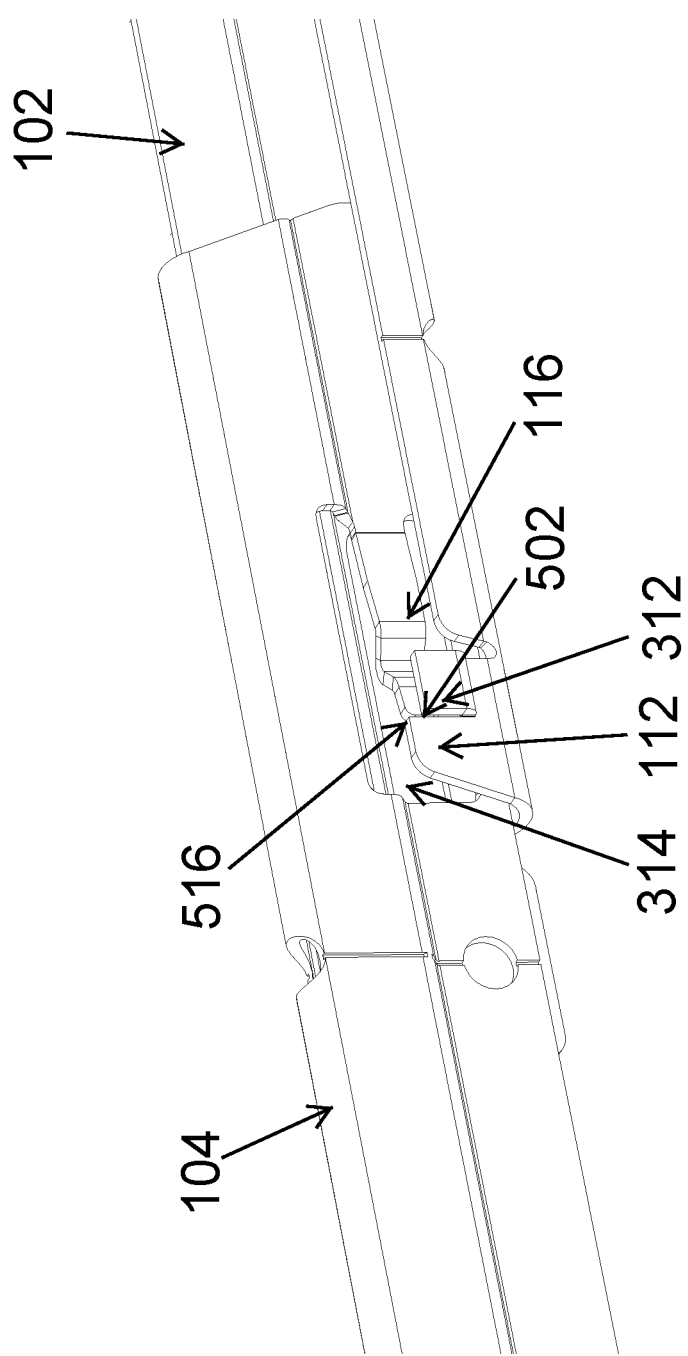

When the first hanger bar member 102 and the second hanger bar member 104 move away from each other, the stoppage tab 112 and the stoppage tab 116 may abut against each other as shown in FIG. 11 blocking further movement of the first hanger bar member 102 and the second hanger bar member 104 away from each other. The guide tab 312 may guide the stoppage tab 116 toward the stoppage tab 112 such that the edge 502 and the edge 516 abut against each other. The guide tab 312 may also prevent the stoppage tab 116 from moving on a side of the stoppage tab 112 facing away from the second hanger bar member 104. Thus, the stoppage tab 112 and the stoppage tab 116 may prevent or reduce the risk of unintentional disengagement of the first hanger bar member 102 and the second hanger bar member 104 from each other, which in turn may prevent or reduce the risk of unintentional disengagement of the hanger bar assembly 101 of FIG. 1 from the plaster frame 106.

In some example embodiments, from the position shown in FIG. 11, a user may push the stoppage tab 116 toward the opening 314 so that the edges 502 and 516 no longer abut against each other, which allows the first hanger bar member 102 and the second hanger bar member 104 to detach from each other.

Figure 12A:
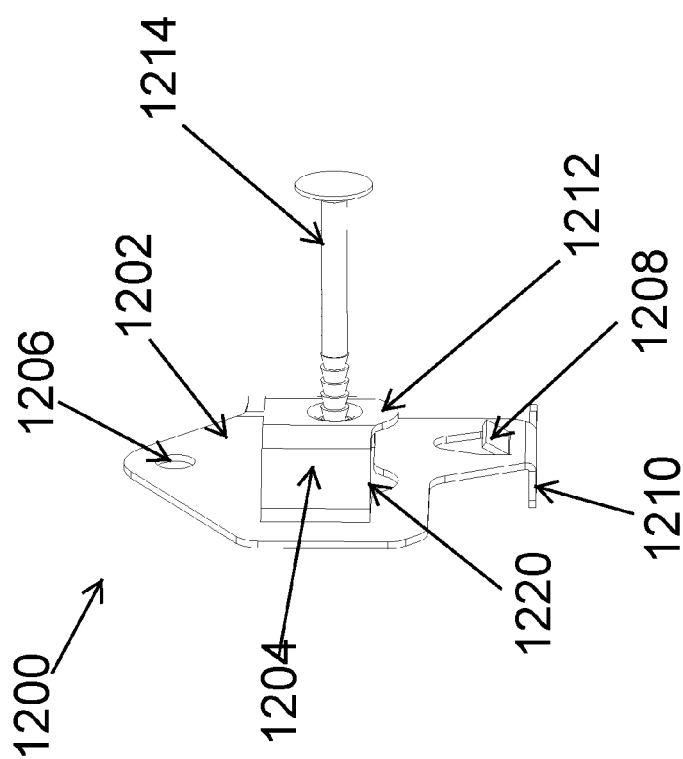
FIGS. 12A and 12B illustrate various views of an attachment head of the hanger bars of the hanger bar assembly of FIG. 1 according to an example embodiment.
Figure 12B:
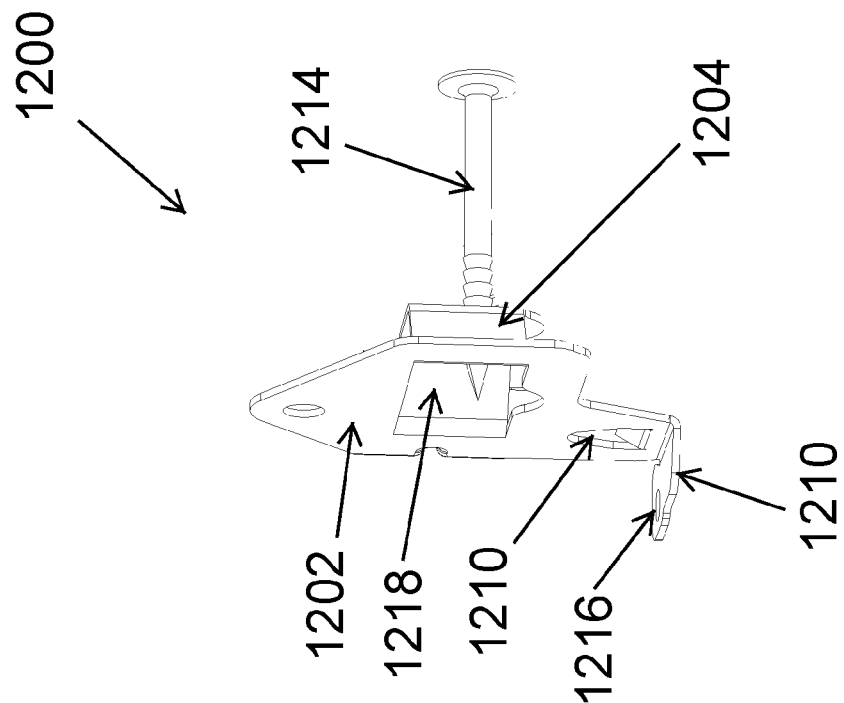

FIGS. 12A and 12B illustrate various views of an attachment head of the hanger bars of the hanger bar assembly of FIG. 1 according to an example embodiment. For example, the attachment head 1200 may correspond to the first attachment head 110 and the second attachment head 114 shown in FIG. 1. In some example embodiments, the attachment head 1200 includes a wall 1202 and a horizontal bump 1204 extending out from the wall 1202. For example, the horizontal bump 1204 may be formed by punching out a portion of the wall 1202. To illustrate, a cavity 1218 may be formed when the bump 1204 is formed. A fastener 1214 (e.g., a nail, a screw, etc.) may be attached to the horizontal bump 1204. In some example embodiments, the fastener 1214 may be used to attach the attachment head 1200 to a support structure such as a joist.

Figure 14:
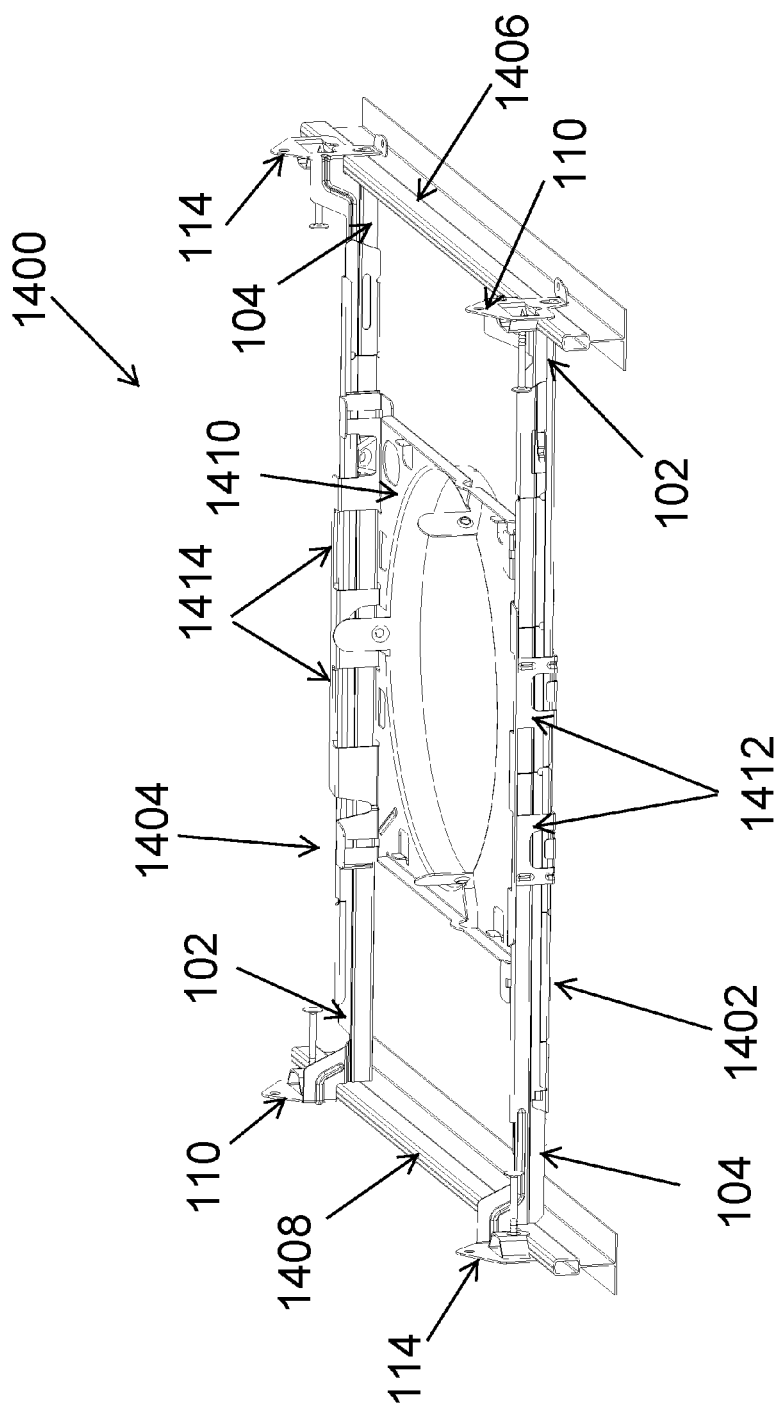
FIG. 14 illustrates a luminaire mounting structure attached to inverted T-bars according to an example embodiment.

In some example embodiments, the horizontal bump 1204 includes a tab 1212 extending down on a side of the bump 1204 that is parallel to the wall 1202. In some example embodiments, bump 1204 may rest on a support structure such as an inverted T-bar such that the wall 1202 and the tab 1212 are on opposite sides of the inverted T-bar. For example, an edge 1220 of the bump 1204 may be in contact with a top surface of an inverted T-bar such as shown in FIG. 14.

In some example embodiments, the attachment head 1200 has an aperture 1206 in the wall 1202. For example, a fastener such as a screw or a nail may be inserted through the aperture 1206 to secure the attachment head 1200 to a support structure.

In some example embodiments, the attachment head 1200 may include a flange 1210 extending substantially horizontally from a bottom end of the wall 1202 and in a direction away from the bump 1204. The flange 1210 may have an aperture 1216 for securing the attachment head 1200 to a support structure by inserting a fastener (e.g., a nail or a screw) through the aperture 1216.

In some example embodiments, a tab 1208 may angularly extend upward from the wall 1202 proximal to a bottom end of the wall 1202. For example, the tab 1208 may help prevent vertical detachment of the attachment head 1200 from a support structure such as an inverted T-bar. In some example embodiments, a fastener may be extended through the opening 1210 to securely attach the wall 1202 to a support structure.

Although the fastener 1214 is shown as attached to the bump in FIGS. 12A and 12B, in some alternative embodiments, the fastener 1214 may be omitted and one or more means of securing the attachment head 1200 to a support structure may be used as described above.

Figure 13:
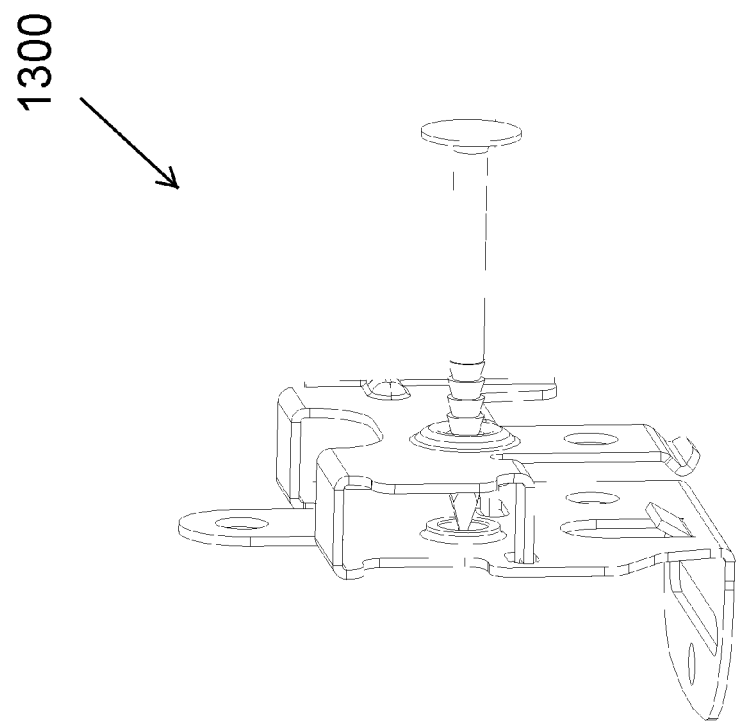
FIG. 13 illustrates an attachment head of the hanger bars of the hanger bar assembly of FIG. 1 according to another example embodiment.

FIG. 13 illustrates an attachment head 1300 of the hanger bars of the hanger bar assembly of FIG. 1 according to another example embodiment. In some example embodiments, the hanger bar members 102, 104 of FIG. 1 may include the attachment head 1300 instead of the attachment head 1200 of FIGS. 12A and 12B. In some alternative embodiments, the hanger bar members 102, 104 may include an attachment head other than the attachment heads 1200, 1300 without departing from the scope of this disclosure.

FIG. 14 illustrates a luminaire mounting structure 1400 attached to inverted T-bars according to an example embodiment. The luminaire mounting structure 1400 includes a first hanger bar assembly 4102 and a second hanger bar assembly 1404. The first hanger bar assembly 1402 and the second hanger bar assembly 1404 are attached to the plaster frame 1410 at opposite sides of the plaster frame 1410. For example, the first hanger bar assembly 1402 and the second hanger bar assembly 1404 may correspond to the hanger bar assembly 101 of FIG. 1, and the plaster frame 1410 may correspond to the plaster frame 106 of FIG. 1. In some example embodiments, a luminaire housing, such as a housing of a recessed luminaire, may be positioned on the plaster frame 1410.

To illustrate, the first hanger bar assembly 1402 and the second hanger bar assembly 1404 each includes the first hanger bar member 102 and the second hanger bar member 104 that are coupled to respective attachment heads 110, 114. The first hanger bar member 102 and the second hanger bar member 104 of the first hanger bar assembly 1402 may be positioned through passages formed by tabs 1412. Similarly, the first hanger bar member 102 and the second hanger bar member 104 of the second hanger bar assembly 1104 may be positioned through passages formed by tabs 1414.

As illustrated in FIG. 14, the attachment heads 110, 114 of each hanger bar assembly 1402, 1404 may be attached to parallel inverted T-bars 1406, 1408. Because of the adjustability of the hanger bar assemblies 1402, 1404, the hanger bar assemblies 1402, 1404 may be attached to parallel inverted T-bars that have relatively small or large spacings between them.

Figure 15:
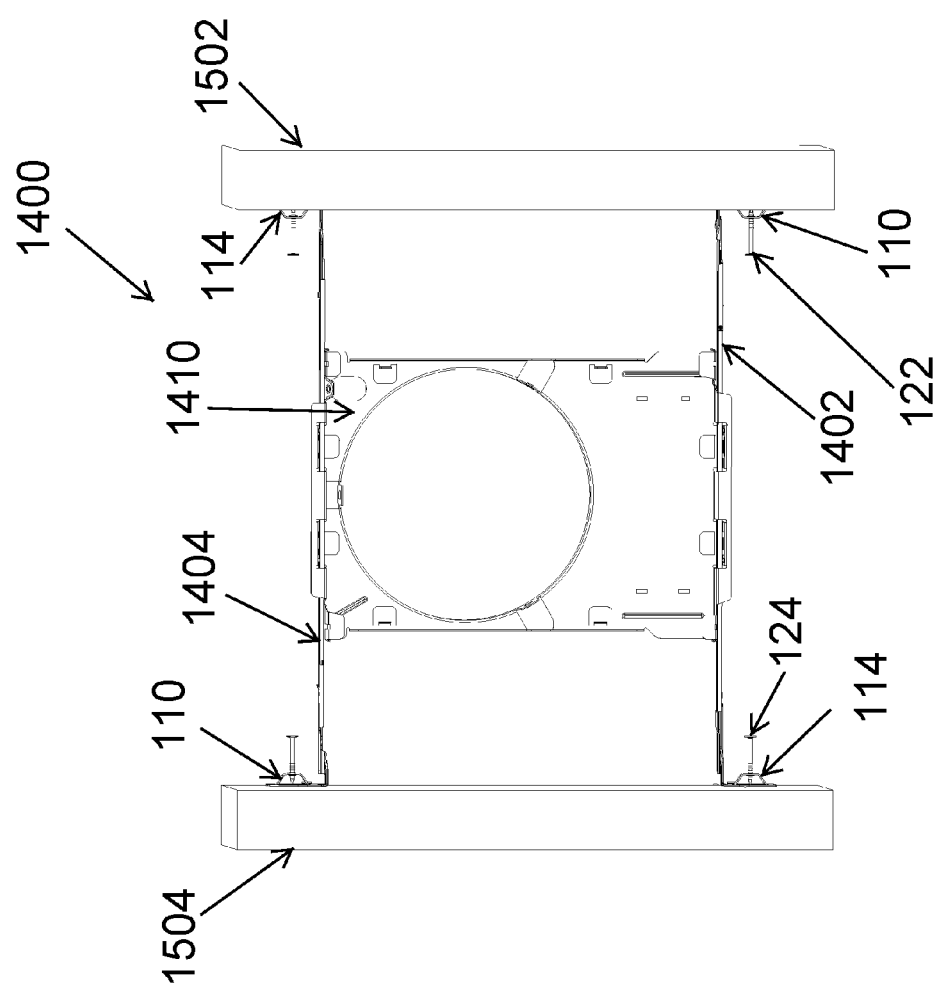
FIG. 15 illustrates a luminaire mounting structure attached to joists according to an example embodiment.

FIG. 15 illustrates a luminaire mounting structure attached to joists according to an example embodiment. As illustrated in FIG. 15, the attachment heads 110, 114 of each hanger bar assembly 1102, 1104 may be attached to parallel joists 1502, 1504. For example, the attachment heads 110, 114 may be secured to the joists 1502, 1504 using respective fasteners 122, 124. Because of the adjustability of the hanger bar assemblies 1402, 1404, the hanger bar assemblies 1402, 1404 may be attached to parallel joists that have relatively small or large spacings between them.

Although particular embodiments have been described herein in detail, the descriptions are by way of example. The features of the example embodiments described herein are representative and, in alternative embodiments, certain features, elements, and/or steps may be added or omitted. Additionally, modifications to aspects of the example embodiments described herein may be made by those skilled in the art without departing from the spirit and scope of the following claims, the scope of which are to be accorded the broadest interpretation so as to encompass modifications and equivalent structures.

What is claimed is:

1. A hanger bar assembly, comprising:
a first hanger bar member; and
a second hanger bar member attached to the first hanger bar member, wherein the first hanger bar member comprises:
 a first channel segment including a first channel;
 a first stoppage tab extending up above an edge of the first channel segment; and
 a guide tab extending up above the edge of the first channel segment and offset from the first stoppage tab; and
wherein the second hanger bar member comprises:
 a second channel segment including a second channel; and
 a second stoppage tab, wherein the first stoppage tab and the second stoppage tab are designed to abut against each other to prevent unintended disengagement of the first hanger bar member from the second hanger bar member.

2. The hanger bar assembly of claim 1, wherein the guide tab is positioned adjacent to the first stoppage tab.

3. The hanger bar assembly of claim 1, wherein the second stoppage tab is elastically movable to disengage the first hanger bar member and the second hanger bar member from each other.

4. The hanger bar assembly of claim 1, wherein the first stoppage tab is aligned with an opening in the first hanger bar member and wherein the second stoppage tab is aligned with an opening in the second hanger bar member.

5. The hanger bar assembly of claim 4, wherein the second stoppage tab includes a back section, a middle section, and a front section, the middle section being between the back section and the front section.

6. The hanger bar assembly of claim 5, wherein at least a portion of the middle section is positioned in the opening in the first hanger bar member when the front section is in contact with a surface of the first stoppage tab.

7. The hanger bar assembly of claim 1, wherein the second stoppage tab extends out from a wall of the second hanger bar member toward first stoppage tab.

8. The hanger bar assembly of claim 1, wherein a first rail segment of the first hanger bar member is slidably movable in the second channel of the second channel segment and wherein a second rail segment of the second hanger bar member is slidably movable in the first channel of the first channel segment.

9. The hanger bar assembly of claim 8, wherein the first hanger bar member further comprises a first middle segment extending between the first rail segment and the first channel segment, the first rail segment and the first channel segment being offset from each other and wherein the second hanger bar member comprises a second middle segment extending between the second rail segment and the second channel segment, the second rail segment and the second channel segment being offset from each other.

10. The hanger bar assembly of claim 1, further comprising:
a first attachment head coupled to the first hanger bar member at a second end portion of the first hanger bar member, the end portion of the first hanger bar member and the second end portion of the first hanger bar member being at opposite ends of the first hanger bar member; and
a second attachment head coupled to the second hanger bar member at a second end portion of the second hanger bar member, the end portion of the second hanger bar member and the second end portion of the second hanger bar member being at opposite ends of the second hanger bar member, wherein the first attachment structure and the second attachment structure are used to attach the hanger bar assembly to support structures.

11. A hanger bar assembly, comprising:
a first hanger bar member; and
a second hanger bar member attachable to the first hanger bar member, wherein the first hanger bar member comprises:
 a first channel segment including a first channel;
 a first stoppage tab extending up above an edge of the first channel segment; and
 a guide tab extending up above the edge of the first channel segment and offset from the first stoppage tab; and
wherein the second hanger bar member comprises:
 a second channel segment including a second channel; and
 a second stoppage tab, wherein the first stoppage tab and the second stoppage tab are designed to abut against each other to prevent unintended disengagement of the first hanger bar member from the second hanger bar member.

12. The hanger bar assembly of claim 11, wherein the guide tab is positioned adjacent to the first stoppage tab to guide an edge of the second stoppage tab toward an edge of the first stoppage tab.

13. The hanger bar assembly of claim 11, wherein the first stoppage tab is aligned with an opening in the first hanger bar member and wherein the second stoppage tab is aligned with an opening in the second hanger bar member.

14. The hanger bar assembly of claim 13, wherein the second stoppage tab includes a back section, a middle section, and a front section, the middle section being between the back section and the front section.

15. The hanger bar assembly of claim 13, wherein the second stoppage tab is elastically movable toward the opening in the first hanger bar member by exerting a force on the second stoppage tab to enable the first stoppage tab and the second stoppage tab to move past each other.

16. The hanger bar assembly of claim 11, further comprising:
a first attachment head coupled to the first hanger bar member at a second end portion of the first hanger bar member, the end portion of the first hanger bar member and the second end portion of the first hanger bar member being at opposite ends of the first hanger bar member; and
a second attachment head coupled to the second hanger bar member at a second end portion of the second hanger bar member, the end portion of the second hanger bar member and the second end portion of the second hanger bar member being at opposite ends of the second hanger bar member, wherein the first attachment structure and the second attachment structure are used to attach the hanger bar assembly to support structures.

17. A luminaire mounting structure for mounting a recessed luminaire, the luminaire mounting structure comprising:
a first hanger bar assembly;
a second hanger bar assembly; and a plaster frame, wherein the first hanger bar assembly is attached to the plaster frame on a first side of the plaster frame, wherein the second hanger bar assembly is attached to the plaster frame on a second side of the plaster frame opposite the first side, wherein each of the first hanger bar assembly and the second hanger bar assembly comprises a first hanger bar member and a second hanger bar member, wherein the first hanger bar member comprises:

a first hanger bar member; and a second hanger bar member attached to the first hanger bar member, wherein the first hanger bar member comprises:
- a first channel segment including a first channel;
- a first stoppage tab extending up above an edge of the first channel segment; and
- a guide tab extending up above the edge of the first channel segment and offset from the first stoppage tab; and wherein the second hanger bar member comprises:
- a second channel segment including a second channel; and
- a second stoppage tab, wherein the first stoppage tab and the second stoppage tab are designed to abut against each other to prevent unintended disengagement of the first hanger bar member from the second hanger bar member.

18. The luminaire mounting structure of claim 17, wherein the guide tab of the first hanger bar member of each of the first hanger bar assembly and the second hanger bar assembly is positioned adjacent to the respective first stoppage tab to guide an edge of the respective second stoppage tab toward an edge of the respective first stoppage tab.

19. The luminaire mounting structure of claim 17, wherein the first stoppage tab is aligned with an opening in the first hanger bar member, wherein the second stoppage tab is aligned with an opening in the second hanger bar member, wherein the second stoppage tab is elastically movable toward the opening in the first hanger bar member by exerting a force on the second stoppage tab to enable the first stoppage tab and the second stoppage tab to move past each other.

20. The luminaire mounting structure of claim 17, wherein each of the first hanger bar assembly and the second hanger bar assembly further comprises:
- a first attachment head coupled to the first hanger bar member at a second end portion of the first hanger bar member, the end portion of the first hanger bar member and the second end portion of the first hanger bar member being at opposite ends of the first hanger bar member; and
- a second attachment head coupled to the second hanger bar member at a second end portion of the second hanger bar member, the end portion of the second hanger bar member and the second end portion of the second hanger bar member being at opposite ends of the second hanger bar member, wherein the first attachment structure and the second attachment structure are used to attach the hanger bar assembly to support structures.

* * * * *